US012663362B2

(12) United States Patent
Kim et al.

(10) Patent No.: US 12,663,362 B2
(45) Date of Patent: Jun. 23, 2026

(54) APPARATUS AND METHOD FOR DETECTING SMOKE USING MULTI-ANGLE LIGHT SCATTERING

(71) Applicant: Electronics and Telecommunications Research Institute, Daejeon (KR)

(72) Inventors: Soocheol Kim, Daejeon (KR); JeongKyun Kim, Daejeon (KR); Jin Hwa Ryu, Daejeon (KR); Hoe-Sung Yang, Daejeon (KR); Kang Bok Lee, Daejeon (KR); Sun-Hwa Lim, Daejeon (KR); Kwang-Soo Cho, Daejeon (KR); Kyu Won Han, Daejeon (KR); Sang Gi Hong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 122 days.

(21) Appl. No.: 18/440,489

(22) Filed: Feb. 13, 2024

(65) Prior Publication Data

US 2025/0003860 A1 Jan. 2, 2025

(30) Foreign Application Priority Data

May 26, 2023 (KR) ........................ 10-2023-0068506

(51) Int. Cl.
*G01N 15/149* (2024.01)
*G01N 15/00* (2024.01)
(Continued)

(52) U.S. Cl.
CPC ....... *G01N 15/149* (2024.01); *G01N 15/1429* (2013.01); *G01N 15/1434* (2013.01);
(Continued)

(58) Field of Classification Search
CPC ............. G01N 15/149; G01N 15/1429; G01N 15/1434; G01N 2015/0046; G01N 2015/1477
See application file for complete search history.

(56) References Cited

U.S. PATENT DOCUMENTS

| | | | | | |
|---|---|---|---|---|---|
| 5,502,434 A | * | 3/1996 | Minowa | ............... | G08B 17/103 340/630 |
| 7,126,687 B2 | | 10/2006 | Hill et al. | | |

(Continued)

FOREIGN PATENT DOCUMENTS

| | | |
|---|---|---|
| JP | 8-271423 A | 10/1996 |
| JP | 4546662 B2 | 9/2010 |

(Continued)

OTHER PUBLICATIONS

Park et al "Fine Dust Analysis Apparatus", Aug. 26, 2020, KR 102147627 B1 (Year: 2020).*

(Continued)

*Primary Examiner* — Sang H Nguyen
(74) *Attorney, Agent, or Firm* — BROADVIEW IP LAW, PC

(57) ABSTRACT

An apparatus and method for detecting smoke using multi-angle light scattering. The apparatus includes a light source array in which a plurality of light sources outputting optical signals of a same wavelength are arranged at a regular interval and configured to output the optical signals at different irradiation angles to smoke particles, a lens configured to divert optical paths of the optical signals output from each of the plurality of light sources included in the light source array, an optical detector configured to measure the optical signals that pass through the lens and are scattered and absorbed by the smoke particles, and a computing device configured to classify types of the smoke particles (Continued)

100 using a scattering coefficient and an absorption coefficient of the smoke particles determined through the measured optical signals.

4 Claims, 10 Drawing Sheets

(51) Int. Cl.
| | |
|---|---|
| *G01N 15/14* | (2024.01) |
| *G01N 15/1429* | (2024.01) |
| *G01N 15/1434* | (2024.01) |

(52) U.S. Cl.
CPC ............... *G01N 2015/0046* (2013.01); *G01N 2015/1477* (2013.01)

(56) References Cited

U.S. PATENT DOCUMENTS

| | | | | |
|---|---|---|---|---|
| 7,788,969 B2 * | 9/2010 | Verdegan | ........... | G01N 15/0205 |
| | | | | 73/61.69 |
| 9,030,916 B2 | 5/2015 | Park et al. | | |
| 9,092,959 B2 | 7/2015 | Kim et al. | | |
| 2007/0064980 A1 * | 3/2007 | Knox | ..................... | G01N 21/85 |
| | | | | 382/128 |
| 2008/0297360 A1 * | 12/2008 | Knox | ................... | G08B 17/117 |
| | | | | 340/628 |
| 2009/0184830 A1 * | 7/2009 | Watabe | ................ | G01N 29/024 |
| | | | | 340/628 |
| 2011/0058167 A1 * | 3/2011 | Knox | ..................... | G01N 21/53 |
| | | | | 356/338 |
| 2012/0170035 A1 * | 7/2012 | Dohi | .................... | G08B 17/107 |
| | | | | 356/343 |
| 2016/0116389 A1 * | 4/2016 | Cooper | .............. | G01N 15/0227 |
| | | | | 356/340 |
| 2019/0391073 A1 | 12/2019 | Tanaka | | |
| 2021/0156800 A1 * | 5/2021 | Finn | ........................ | G01N 21/53 |

FOREIGN PATENT DOCUMENTS

| | | |
|---|---|---|
| JP | 2016-114959 A | 6/2016 |
| KR | 10-2016-0006155 A | 1/2016 |
| KR | 10-1898393 B1 | 9/2018 |
| KR | 10-1963111 B1 | 7/2019 |
| KR | 10-2020-0005770 A | 1/2020 |
| KR | 10-2081761 B1 | 2/2020 |
| KR | 10-2093401 B1 | 3/2020 |
| KR | 10-2318951 B1 | 10/2021 |
| KR | 10-2021-0145996 A | 12/2021 |
| KR | 10-2022-0156013 A | 11/2022 |

OTHER PUBLICATIONS

Zhang et al "Gas-solid Two-phase Parameter Measuring Method Based on Laser Absorption Spectrum Tomography", Feb. 11, 2021, CN 113588504 A (Year: 2021).*

Li, Kaiyuan et al., "Dual-Wavelength Smoke Detector Measuring Both Light Scattering and Extinction to Reduce False Alarms," MDPI. Apr. 2023. DOI: /10.3390/fire6040140.

* cited by examiner

APPARATUS AND METHOD FOR DETECTING SMOKE USING MULTI-ANGLE LIGHT SCATTERING

CROSS-REFERENCE TO RELATED APPLICATION

This application claims the benefit of Korean Patent Application No. 10-2023-0068506 filed on May 26, 2023, in the Korean Intellectual Property Office, the entire disclosure of which is incorporated herein by reference for all purposes.

BACKGROUND

1. Field of the Invention

One or more embodiments relate to an apparatus and method for classifying types of smoke by irradiating a light source to smoke particles from multiple angles and analyzing a scattering coefficient and an absorption coefficient.

2. Description of the Related Art

A fire detection device using a general photoelectric smoke detection method includes a light-receiving element and a light-emitting element and provides a method of detecting smoke by measuring an optical signal scattered by smoke particles. However, such a fire detection device detects not only fire smoke but also cooking smoke, fine dust, water vapor, and yellow dust, which are not factors for fire, and thus, there is an issue of low accuracy and low reliability.

In order to improve the accuracy and reliability of the fire detection device, a method of detecting smoke using two light sources of different wavelengths and a method of detecting smoke using light scattering and light exposure effects have been proposed. Such a fire detection device has improved the accuracy and reliability thereof compared to the fire detection device using a general photoelectric smoke detection method but still low accuracy and an issue of detecting non-fire factors.

More specifically, the method of detecting smoke using light scattering and light exposure effects analyzes smoke particles by arranging two light-receiving elements at different angles and observing scattering and absorption of the smoke particles. Since a scattering signal is obtained by a single light-receiving element, it is very difficult to analyze a scattering coefficient and only the degree of scattering may be analyzed.

In addition, due to different scattering patterns depending on concentration, particle size, and shape of smoke, there are limits to extracting characteristics of smoke with a single light-receiving element. When more light-receiving elements are arranged at multiple angles, the accuracy and reliability of analysis and classification may be improved, but product miniaturization and commercialization are difficult due to issues of an electrical circuit and analog-to-digital converter (ADC) channel configuration for a large number of light-receiving elements.

SUMMARY

Embodiments are to provide an apparatus and method for distinguishing between fire smoke and non-fire factors with high accuracy and high reliability by analyzing a scattering coefficient and an absorption coefficient, which are optical characteristics of smoke.

However, technical aspects are not limited to the foregoing aspect, and there may be other technical aspects.

According to an aspect, there is provided an apparatus for detecting smoke, the apparatus including a light source array in which a plurality of light sources outputting optical signals of a same wavelength are arranged at a regular interval and configured to output the optical signals at different irradiation angles to smoke particles, a lens configured to divert optical paths of the optical signals output from each of the plurality of light sources included in the light source array, an optical detector configured to measure the optical signals that pass through the lens and are scattered and absorbed by the smoke particles, and a computing device configured to classify types of the smoke particles using a scattering coefficient and an absorption coefficient of the smoke particles determined through the measured optical signals.

The computing device may be further configured to identify optical intensity of the optical signals measured by the optical detector, normalize the identified optical intensity of the optical signals, using the normalized optical intensity of the optical signals, derive a full width at half maximum (FWHM) of an optical irradiation angle, and using the derived FWHM, determine the scattering coefficient of the smoke particles.

The computing device may be further configured to normalize the identified optical intensity of the optical signals by subtracting the identified optical intensity of the optical signals by optical intensity of an optical signal corresponding to a minimum value among the identified optical intensity of the optical signals, and then dividing optical intensity of the optical signals remaining after the subtraction by optical intensity of an optical signal corresponding to a maximum value among the optical intensity of the optical signals remaining after the subtraction.

The computing device may be further configured to determine the scattering coefficient of the smoke particles using a calibration curve representing an FWHM of an optical irradiation angle derived according to different scattering coefficients stored in advance by being measured through an experiment or calculated through a simulation.

The computing device may be further configured to determine the absorption coefficient of the smoke particles using intensity of an optical signal output from a light source at an irradiation angle of 0 degrees among the plurality of light sources, intensity of an optical signal when the optical signal output from the light source at the irradiation angle of 0 degrees penetrates through the smoke particles and is measured by the optical detector, and a penetration distance.

According to another aspect, there is provided an apparatus for detecting smoke, the apparatus including a light source array in which a plurality of light sources outputting optical signals of different wavelengths are arranged at a regular interval and configured to output the optical signals at different irradiation angles to smoke particles, a lens configured to divert optical paths of the optical signals output from each of the plurality of light sources included in the light source array, a spectroscope configured to measure the optical signals that pass through the lens and are scattered and absorbed by the smoke particles, and a computing device configured to classify types of the smoke particles using a scattering coefficient and an absorption coefficient of the smoke particles determined through the measured optical signals.

The computing device may be further configured to identify optical intensity of the optical signals measured by the spectroscope, normalize the identified optical intensity of the optical signals, using the normalized optical intensity of the optical signals, derive an FWHM of an optical irradiation angle, and using the derived FWHM of the optical irradiation angle, determine the scattering coefficient of the smoke particles.

The computing device may be further configured to normalize the identified optical intensity of the optical signals by subtracting the identified optical intensity of the optical signals by optical intensity of an optical signal corresponding to a minimum value among the identified optical intensity of the optical signals, and then dividing the optical intensity of the optical signals remaining after the subtraction by optical intensity of an optical signal corresponding to a maximum value among the optical intensity of the optical signals remaining after the subtraction.

The computing device may be further configured to determine the scattering coefficient of the smoke particles using a calibration curve representing an FWHM of an optical irradiation angle derived according to different scattering coefficients stored in advance by being measured through an experiment or calculated through a simulation.

The computing device may be further configured to determine the absorption coefficient of the smoke particles using intensity of an optical signal output from a light source at an irradiation angle of 0 degrees among the plurality of light sources, intensity of an optical signal when the optical signal output from the light source at the irradiation angle of 0 degrees penetrates through the smoke particles and is measured by the spectroscope, and a penetration distance.

According to another aspect, there is provided a method of detecting smoke, the method including identifying optical intensity of optical signals measured by an optical detector or a spectroscope, normalizing the identified optical intensity of the optical signals, using the normalized optical intensity of the optical signals, deriving an FWHM of an optical irradiation angle, and using the derived FWHM, determining a scattering coefficient of smoke particles, determining an absorption coefficient of the smoke particles using intensity of an optical signal output from a light source at an irradiation angle of 0 degrees among a plurality of light sources, intensity of an optical signal when the optical signal output from the light source at the irradiation angle of 0 degrees penetrates through the smoke particles and is measured by the optical detector or the spectroscope, and a penetration distance, and classifying types of the smoke particles using the determined scattering coefficient and the determined absorption coefficient of the smoke particles.

The determining of the scattering coefficient may include normalizing the identified optical intensity of the optical signals by subtracting the identified optical intensity of the optical signals by optical intensity of an optical signal corresponding to a minimum value among the identified optical intensity of the optical signals, and then dividing optical intensity of the optical signals remaining after the subtraction by optical intensity of an optical signal corresponding to a maximum value among the optical intensity of the optical signals remaining after the subtraction.

The determining of the scattering coefficient may include determining the scattering coefficient of the smoke particles using a calibration curve representing the FWHM derived according to different scattering coefficients stored in advance by being measured through an experiment or calculated through a simulation.

Additional aspects of embodiments will be set forth in part in the description which follows and, in part, will be apparent from the description, or may be learned by practice of the disclosure.

According to an embodiment, fire smoke may be distinguished from non-fire factors with high accuracy and high reliability by analyzing a scattering coefficient and an absorption coefficient, which are optical characteristics of smoke.

Furthermore, according to an embodiment, miniaturization and price competitiveness are excellent due to a simple setup configuration and the present disclosure may be used to analyze various physical properties, such as solid sample analysis and skin condition analysis, in addition to smoke particle analysis.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
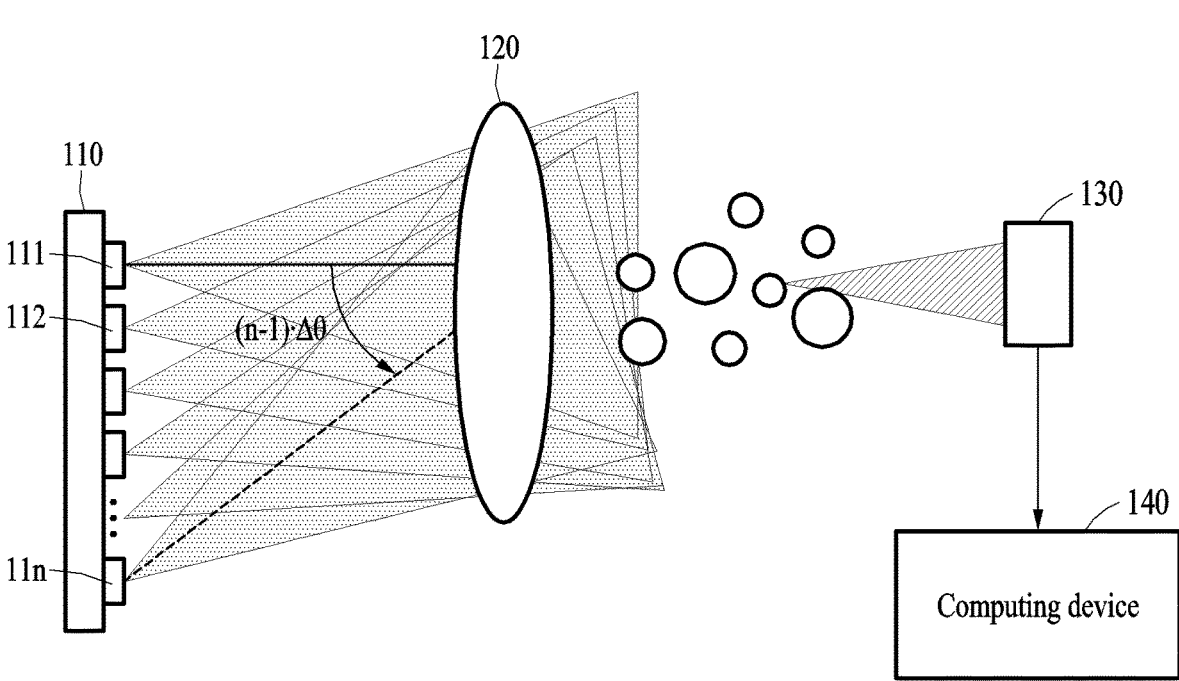
FIG. 1 is a diagram illustrating an example of a configuration of a smoke detection apparatus according to an embodiment.

The following detailed structural or functional description is provided as an example only and various alterations and modifications may be made to the embodiments. Accordingly, the embodiments are not construed as limited to the disclosure and should be understood to include all changes, equivalents, and replacements within the idea and the technical scope of the disclosure.

Although terms, such as first, second, and the like are used to describe various components, the components are not limited to the terms. These terms should be used only to distinguish one component from another component. For example, a first component may be referred to as a second component, and similarly the second component may also be referred to as the first component.

It should be noted that if one component is described as being "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. As used herein, "A or B", "at least one of A and B", "at least one of A or B", "A, B or C", "at least one of A, B and C", and "at least one of A, B, or C," each of which may include any one of the items listed together in the corresponding one of the phrases, or all possible combinations thereof. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which the present disclosure pertains. Terms, such as those defined in commonly used dictionaries, should be construed to have meanings matching with contextual meanings in the relevant art, and are not to be construed to have an ideal or excessively formal meaning unless otherwise defined herein.

Hereinafter, the embodiments will be described in detail with reference to the accompanying drawings. When describing the examples with reference to the accompanying drawings, like reference numerals refer to like components and a repeated description related thereto will be omitted.

FIG. 1 is a diagram illustrating an example of a configuration of a smoke detection apparatus according to an embodiment.

Referring to FIG. 1, a smoke detection apparatus 100 provided in the present disclosure may include a light source array 110, a lens 120, an optical detector 130, and a computing device 140. First, the light source array 110 may include a plurality of light sources outputting optical signals of the same wavelength, which may be arranged at a regular interval and may output the optical signals at different irradiation angles to smoke particles. Here, the light sources included in the light source array 110 may be turned on/off sequentially so that the optical signals at different irradiation angles may be output.

For example, a first light source 111 included in the light source array 110 may output an optical signal to smoke particles at an irradiation angle of 0 degrees. A second light source 112 after the first light source 111 may output an optical signal to smoke particles at an irradiation angle of $\Delta\theta$ and an n-th light source 11$n$ may output an optical signal to smoke particles at an irradiation angle of $(n-1)\cdot\Delta\theta$.

The lens 120 may divert optical paths of the optical signals output from each of the plurality of light sources included in the light source array 110. More specifically, the lens 120 may divert the optical paths of the optical signals at different irradiation angles output from each of the plurality of light sources into the direction in which the optical detector 130 is arranged.

The optical detector 130 may measure the optical signals at different irradiation angles scattered and absorbed by the smoke particles behind the lens 120.

The computing device 140 may classify types of the smoke particles using a scattering coefficient and an absorption coefficient of the smoke particles determined through the measured optical signals. More specifically, the computing device 140 may determine the scattering coefficient of the smoke particles using a full width at half maximum (FWHM) of an optical irradiation angle measured by the optical detector 130. In addition, the computing device 140 may determine the absorption coefficient of the smoke particles using the optical signal output from the light source at an irradiation angle of 0 degrees among the plurality of light sources.

Figure 2:
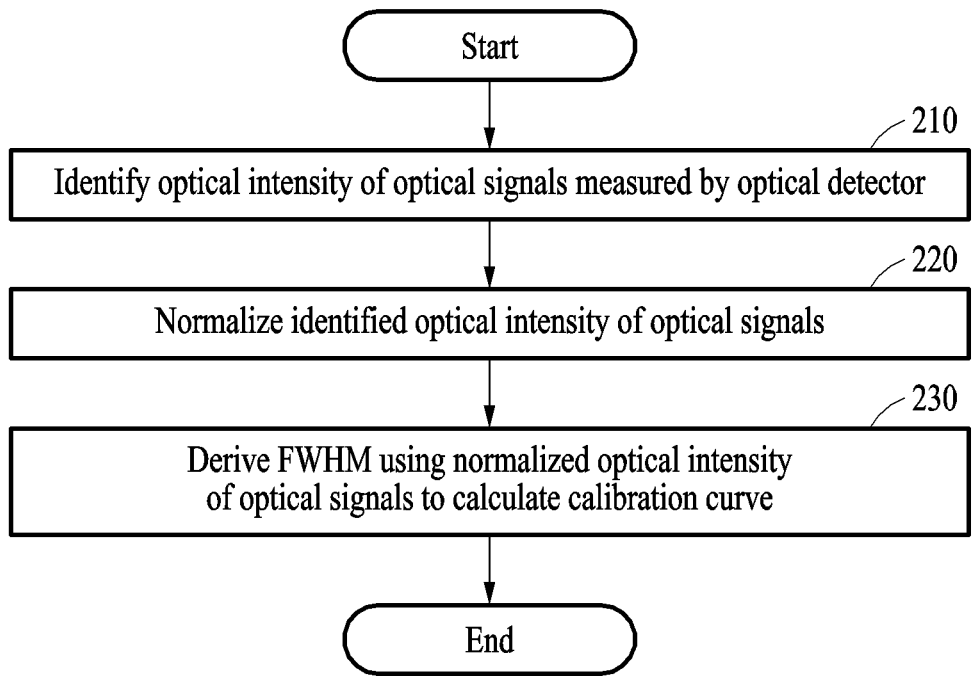
FIG. 2 is a diagram illustrating a process of calculating a calibration curve to derive a scattering coefficient, according to an embodiment.

FIG. 2 is a diagram illustrating a process of calculating a calibration curve to derive a scattering coefficient, according to an embodiment.

Figure 3A:
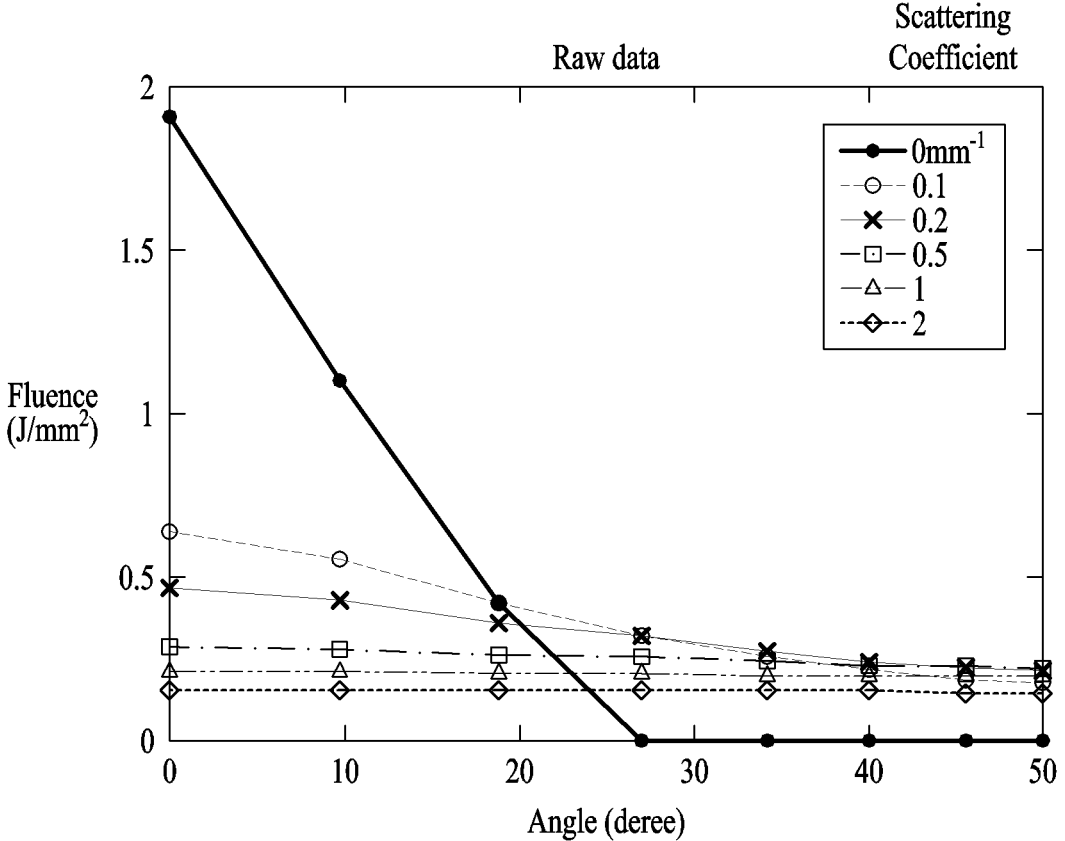
FIGS. 3A to 3C are diagrams illustrating a light scattering simulation according to an embodiment.

In operation 210, the computing device 140 of the smoke detection apparatus 100 may identify optical intensity of optical signals measured by an optical detector. Here, the computing device 140 may identify raw data for the optical intensity of the optical signals measured by the optical detector when examining the optical signals for a sample, that is, smoke particles, which has various scattering coefficients, as shown in FIG. 3A.

Figure 3B:
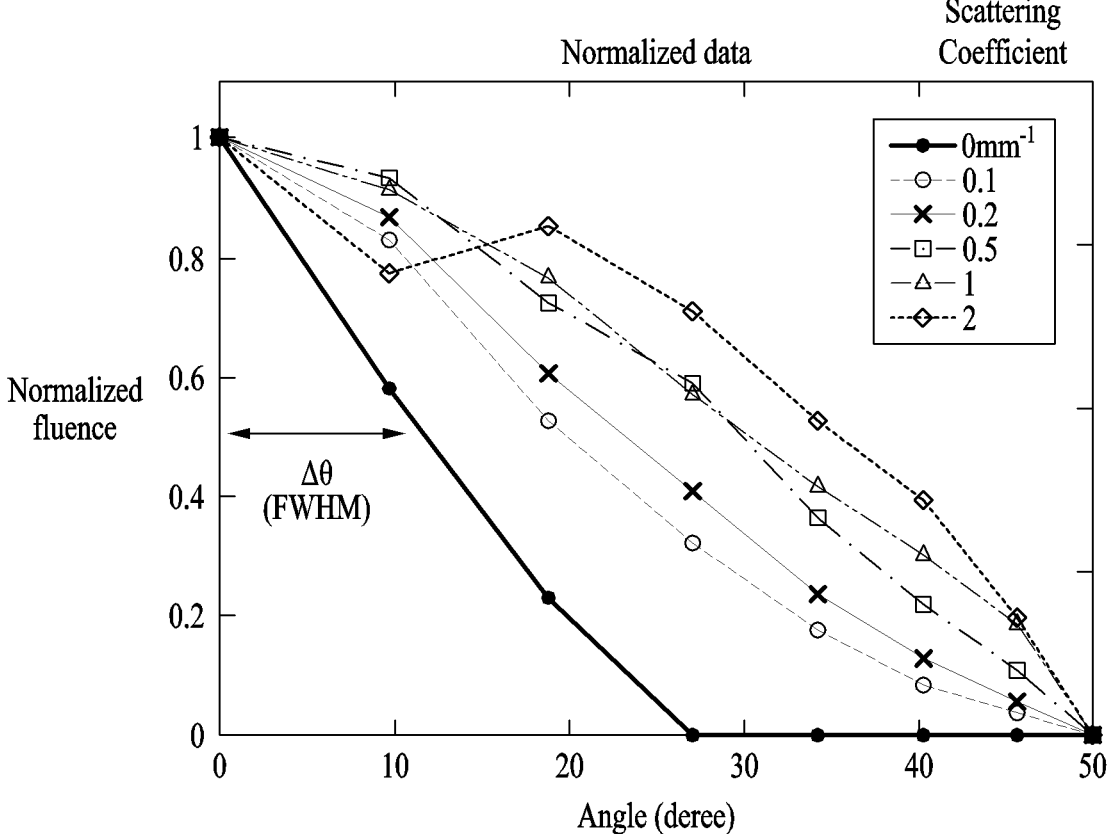

In operation 220, the computing device 140 may normalize the identified optical intensity of the optical signals. More specifically, the computing device 140 may normalize the identified optical intensity of the optical signals, as shown in FIG. 3B, by subtracting the identified optical intensity of the optical signals by optical intensity of an optical signal corresponding to the minimum value among the identified optical intensity of the optical signals, and then dividing optical intensity of the optical signals remaining after the subtraction by optical intensity of an optical signal corresponding to the maximum value among the optical intensity of the optical signals remaining after the subtraction.

Figure 3C:
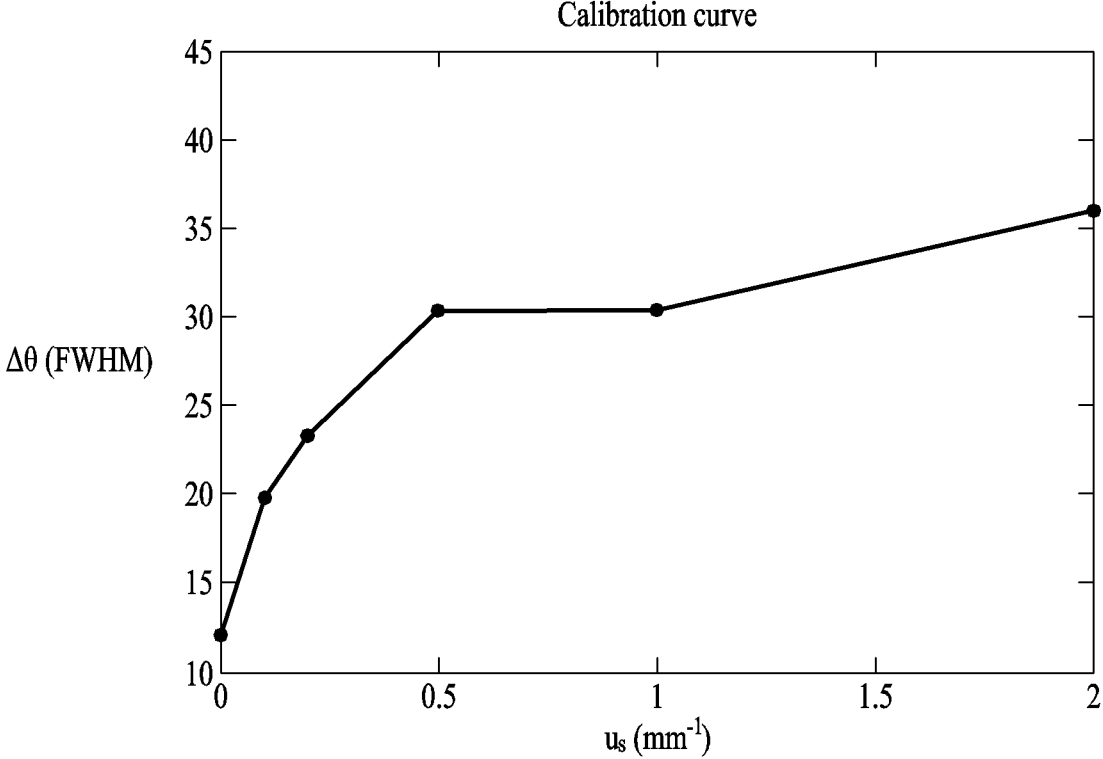

In operation 230, the computing device 140 may derive the FWHM of an optical irradiation angle using the normalized optical intensity of the optical signals. Here, the computing device 140 may calculate a calibration curve, as shown in FIG. 3C, by deriving the FWHM using an irradiation angle in which the normalized fluence is half, in response to various scattering coefficients shown in FIG. 3B. The calibration curve representing the FWHM of the irradiation angle according to the scattering coefficients may be stored in a separate memory and may be used when a scattering coefficient of smoke particles to be measured in the future is determined.

Figure 4:
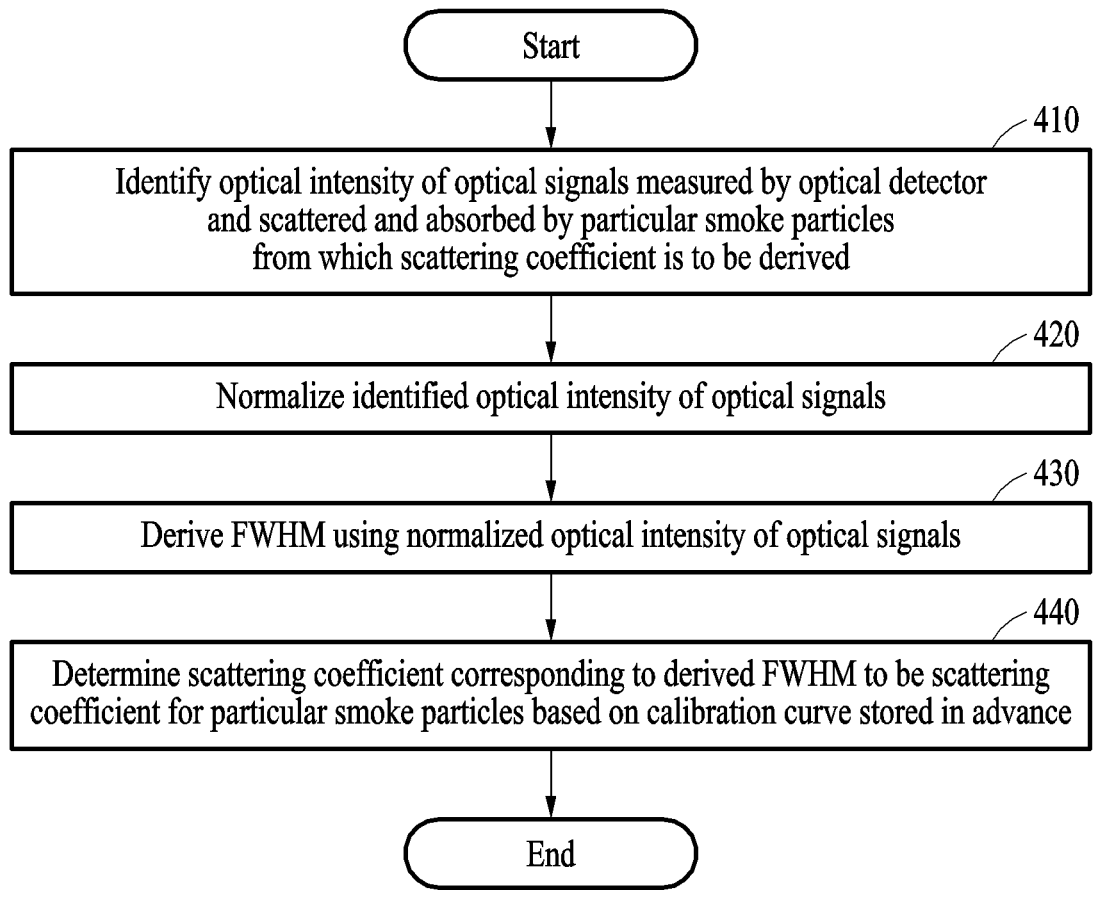
FIG. 4 is a diagram illustrating a process of deriving a scattering coefficient, according to an embodiment.

FIG. 4 is a diagram illustrating a process of deriving a scattering coefficient, according to an embodiment.

In operation 410, the computing device 140 of the smoke detection apparatus 100 may identify optical intensity of optical signals measured by the optical detector and scattered and absorbed by particular smoke particles from which a scattering coefficient is to be derived.

In operation 420, the computing device 140 may normalize the identified optical intensity of the optical signals.

In operation 430, the computing device 140 may derive the FWHM of an optical irradiation angle using the normalized optical intensity of the optical signals.

In operation 440, the computing device 140 may determine the scattering coefficient corresponding to the derived FWHM of the optical irradiation angle to be the scattering coefficient for the particular smoke particles based on a calibration curve representing the FWHM of the optical irradiation angle according to scattering coefficients stored in advance by being measured through an experiment or calculated through a simulation.

Figure 5A:
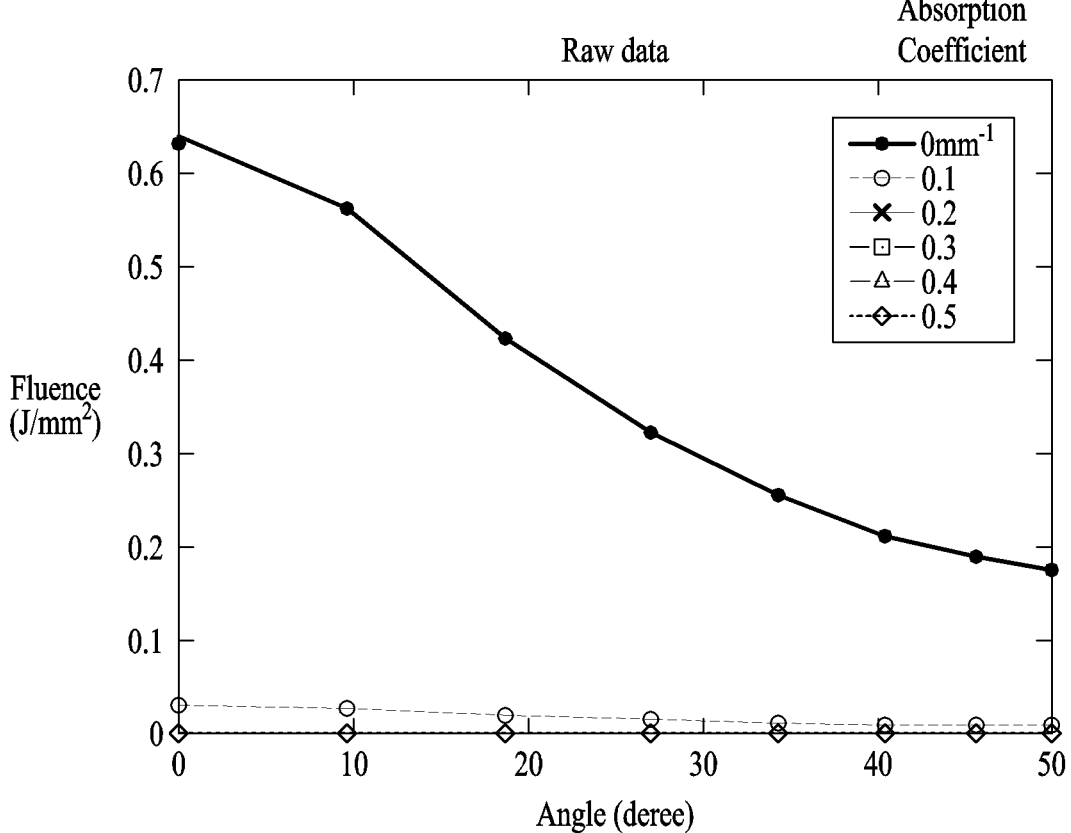
FIGS. 5A and 5B are diagrams illustrating a process of deriving an absorption coefficient, according to an embodiment.
Figure 5B:
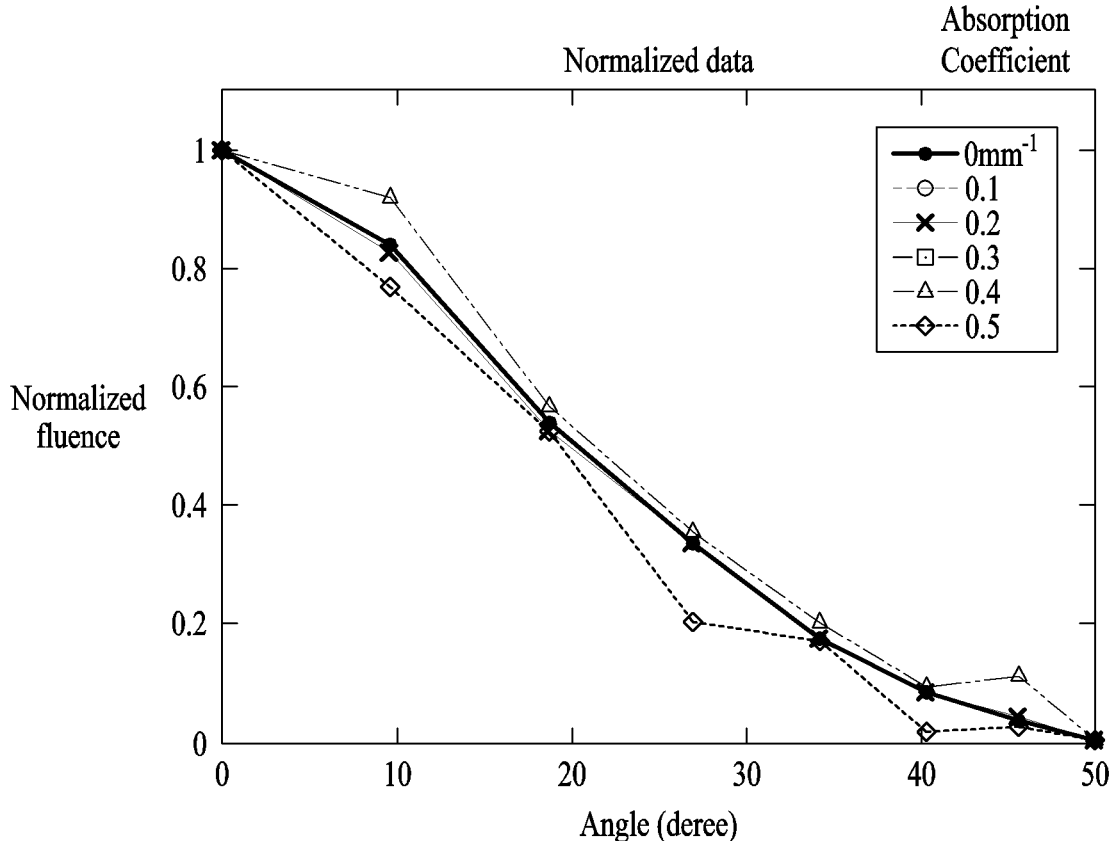

FIGS. 5A and 5B are diagrams illustrating a process of deriving an absorption coefficient, according to an embodiment.

The computing device 140 of the smoke detection apparatus 100 may identify optical intensity of optical signals measured by an optical detector. Here, the computing device 140 may identify raw data for the optical intensity of the optical signals measured by the optical detector when examining the optical signals for a sample, that is, smoke particles, which has various absorption coefficients, as shown in FIG. 5A.

Accordingly, referring to FIG. 5B illustrating normalization of the identified raw data, it may be confirmed that the FWHM of an irradiation angle does not change, even if an absorption coefficient changes. Therefore, the computing device 140 may determine the absorption coefficient using an optical signal of a light source at an irradiation angle of 0 degrees.

More specifically, the optical signal of a light source at an irradiation angle of 0 degrees and an extinction coefficient ($\mu_{ext}$) of the light source penetrating smoke particles may be expressed as shown in Equation 1 below.

$$\frac{I}{I_0} = e^{-\mu_{ext}d} \qquad \text{[Equation 1]}$$

Here, $I_0$ denotes intensity of the optical signal output from the light source at an irradiation angle of 0 degrees among a plurality of light sources, I denotes intensity of the optical signal when the optical signal output from the light source at an irradiation angle of 0 degrees penetrates through the smoke particles and is measured by an optical detector, and d denotes a penetration distance, which is the distance at which the optical signal output from the light source passes through a lens and is measured by the optical detector.

Accordingly, the extinction coefficient may be expressed as the sum of a scattering coefficient ($\mu_s$) and an absorption coefficient ($\mu_a$), as shown in Equation 2 below.

$$\mu_{ext} = \mu_a + \mu_s \qquad \text{[Equation 2]}$$

Therefore, using Equations 1 and 2, the absorption coefficient may be determined as shown in Equation 3 below.

$$\mu_a = -\frac{1}{d}\ln\left(\frac{I}{I_0}\right) - \mu_s \qquad \text{[Equation 3]}$$

Figure 6:
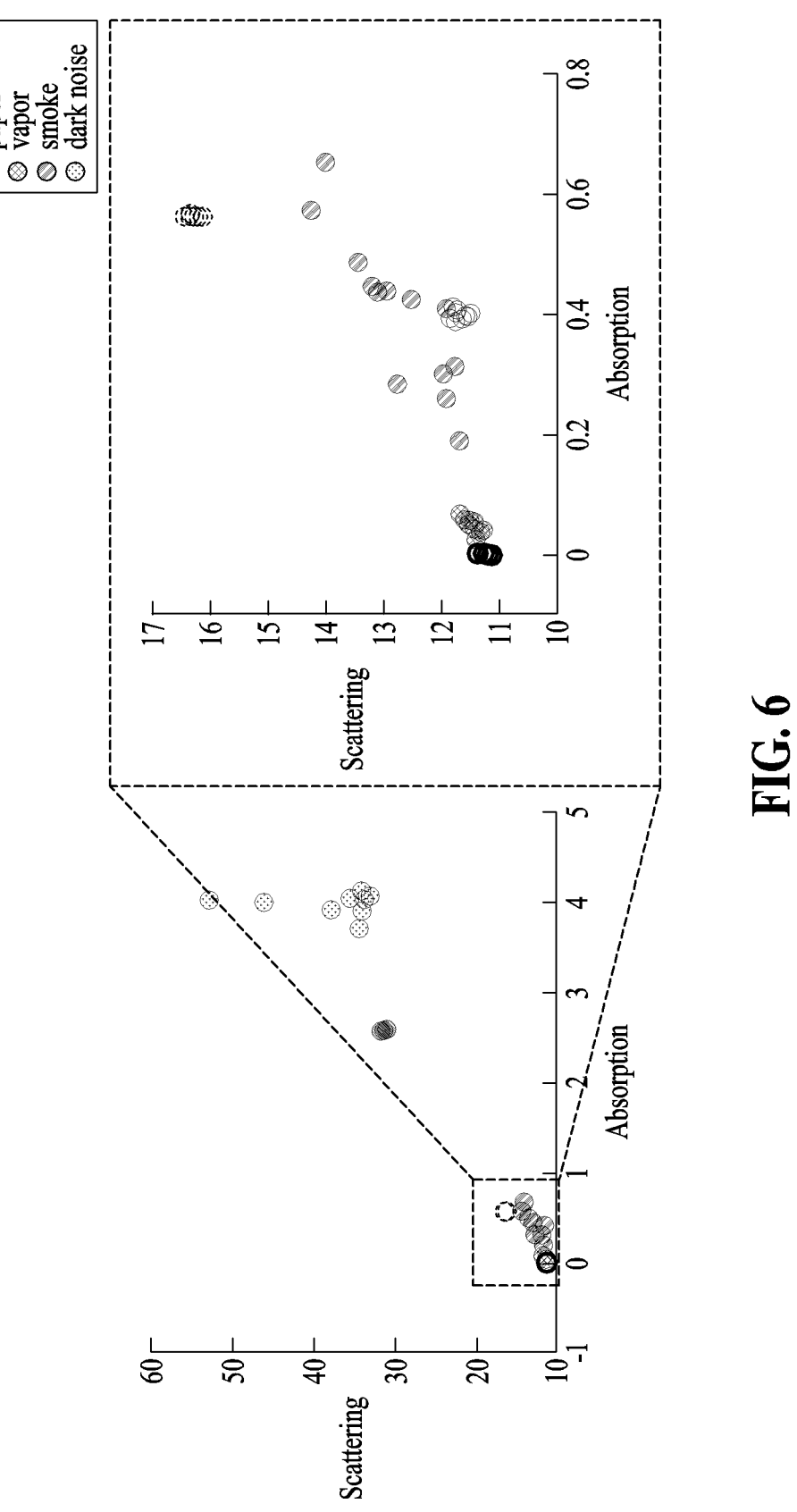
FIG. 6 is a graph of a scattering coefficient and an absorption coefficient measured through an actual experiment according to an embodiment.

FIG. 6 is a graph of a scattering coefficient and an absorption coefficient measured through an actual experiment according to an embodiment.

Smoke particles used in the actual experiment have been measured on solids and gases, and all materials that are scattered and absorbed by optical signals may be measured. Referring to FIG. 6, specific objects to be measured may be air, translucent tape, lens cleaning paper, A4 paper, humidity (vapor), electronic cigarette smoke, and dark noise.

Here, it may be confirmed that each object to be measured is distributed in clusters with others in the scatter plot graph showing scattering coefficients and absorption coefficients. Therefore, the smoke detection apparatus 100 may classify types of smoke particles using the scattering coefficients and the absorption coefficients determined for the smoke particles.

Figure 7:
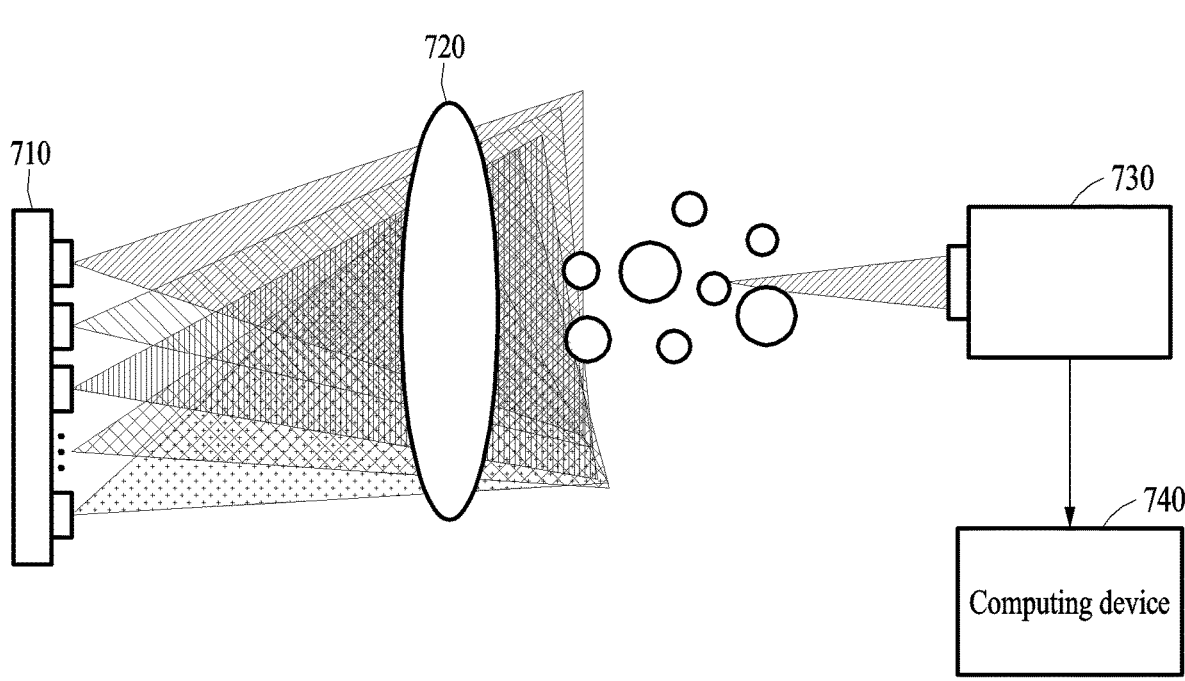
FIG. 7 is a diagram illustrating another example of a configuration of a smoke detection apparatus according to an embodiment.

FIG. 7 is a diagram illustrating another example of a configuration of a smoke detection apparatus according to an embodiment.

Referring to FIG. 7, a smoke detection apparatus 700 provided in the present disclosure may include a light source array 710, a lens 720, a spectroscope 730, and a computing device 740. First, the light source array 710 may include a plurality of light sources outputting optical signals of different wavelengths, which may be arranged at a regular interval and may output the optical signals at different irradiation angles to smoke particles. Here, the smoke detection apparatus 700 may simultaneously output the optical signals at different wavelengths through the light source array 710 such that the smoke detection apparatus 700 may detect smoke quicker than the smoke detection apparatus 100 shown in FIG. 1, sequentially outputting the optical signals at same wavelengths.

The lens 720 may divert optical paths of the optical signals output from each of the plurality of light sources included in the light source array 710. More specifically, the lens 720 may divert the optical paths of the optical signals at different irradiation angles output from each of the plurality of light sources into the direction in which the spectroscope 730 is arranged.

The spectroscope 730 may measure the optical signals at different irradiation angles output from each of the plurality of light sources and scattered and absorbed by the smoke particles behind the lens 720.

The computing device 740 may classify types of the smoke particles using a scattering coefficient and an absorption coefficient of the smoke particles determined using the measured optical signals. More specifically, the computing device 740 may determine the scattering coefficient of the smoke particles using the FWHM of an optical irradiation angle measured by the spectroscope 730. In addition, the computing device 740 may determine the absorption coefficient of the smoke particles using the optical signal output from the light source at an irradiation angle of 0 degrees among the plurality of light sources.

The components described in the embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the embodiments may be implemented by software, and the software may be recorded on a recording medium. The components, the functions, and the processes described in the embodiments may be implemented by a combination of hardware and software.

The embodiments described herein may be implemented using a hardware component, a software component and/or a combination thereof. A processing device may be implemented using one or more general-purpose or special-purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and generate data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be stored in any type of machine, component, physical or virtual equipment, or computer storage medium or device capable of providing instructions or data to or being interpreted by the processing device. The software may also be distributed over network-coupled computer systems so that the software is stored and executed in a distributed fashion. The software and data may be stored in a non-transitory computer-readable recording medium.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs or DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher-level code that may be executed by the computer using an interpreter.

The above-described devices may be configured to act as one or more software modules in order to perform the operations of the above-described embodiments, or vice versa.

Although the embodiments have been described with reference to the limited drawings, one of ordinary skill in the art may apply various technical modifications and variations based thereon. For example, suitable results may be achieved if the described techniques are performed in a different order, and/or if components in a described system, architecture, device, or circuit are combined in a different manner, and/or replaced or supplemented by other components or their equivalents.

Therefore, other implementations, other examples, and equivalents to the claims are also within the scope of the following claims.

What is claimed is:

1. An apparatus for detecting smoke, the apparatus comprising:

a light source array in which a plurality of light sources outputting optical signals of a same wavelength are arranged at a regular interval and configured to output the optical signals at different irradiation angles to smoke particles;

a lens configured to divert optical paths of the optical signals output from each of the plurality of light sources included in the light source array;

an optical detector configured to measure the optical signals that pass through the lens and are scattered and absorbed by the smoke particles; and a computing device configured to classify types of the smoke particles using a scattering coefficient and an absorption coefficient of the smoke particles determined through the measured optical signals, wherein the computing device is further configured to:

identify optical intensity of the optical signals measured by the optical detector;

normalize the identified optical intensity of the optical signals;

using the normalized optical intensity of the optical signals, derive a full width at half maximum (FWHM) of an optical irradiation angle; and using the derived FWHM, determine the scattering coefficient of the smoke particles.

2. The apparatus of claim 1, wherein the computing device is further configured to normalize the identified optical intensity of the optical signals by subtracting the identified optical intensity of the optical signals by optical intensity of an optical signal corresponding to a minimum value among the identified optical intensity of the optical signals, and then dividing optical intensity of the optical signals remaining after the subtraction by optical intensity of an optical signal corresponding to a maximum value among the optical intensity of the optical signals remaining after the subtraction.

3. The apparatus of claim 1, wherein the computing device is further configured to determine the scattering coefficient of the smoke particles using a calibration curve representing an FWHM of an optical irradiation angle derived according to different scattering coefficients stored in advance by being measured through an experiment or calculated through a simulation.

4. The apparatus of claim 1, wherein the computing device is further configured to determine the absorption coefficient of the smoke particles using intensity of an optical signal output from a light source at an irradiation angle of 0 degrees among the plurality of light sources, intensity of an optical signal when the optical signal output from the light source at the irradiation angle of 0 degrees penetrates through the smoke particles and is measured by the optical detector, and a penetration distance.

* * * * *